Patented June 15, 1937

2,083,856

UNITED STATES PATENT OFFICE 2,083,856

PURIFICATION OF ORGANIC
OXY-COMPOUNDS

Richard Z. Moravec, Berkeley, and Theodore Evans and Cecil Humphreys, Martinez, Calif., assignors to Shell Development Company, San Francisco, Calif., a corporation of Delaware No Drawing. Application June 24, 1935, Serial
No. 28,162

18 Claims. (Cl. 260—134)

This invention relates to a process for the purification of organic oxygen-containing compounds contaminated with oxidizable sulphur-containing impurities.

The invention provides an economical and highly effective method for the removal of objectionable sulphur-containing impurities from neutral organic oxy-compounds which may be considered as derivatives of the alcohols, said method comprising contacting the material to be purified with an alkaline compound capable of oxidizing the sulphur impurities, or with an oxidizing agent, preferably under alkaline conditions, at a temperature below that at which the organic oxy-compound is substantially destroyed as by oxidation, polymerization and/or molecular condensation, for a time sufficient to oxidize the sulphur-containing impurities to inoxious or readily removable oxidized sulphur bodies and, in the latter case, separating the removable oxidized sulphur bodies from the treated material, preferably by distillation.

In the manufacture of oxygen-containing organic compounds as ethers, esters, aldehydes, ketones, etc. from alcohols, which alcohols were in turn prepared from olefines or olefine-containing gases as are obtained in the cracking of petroleum and petroleum products, the alcohol derivatives are, in many cases, contaminated with small amounts of oxidizable sulphur compounds which, for the most part, are so difficult to remove that the known methods of purification as by distillation are entirely ineffective. In general, the presence of sulphur compounds in even very small amounts renders the alcohol derivatives much less valuable. The sulphur compounds impart to them disagreeable odors and, in many cases the oxy-compounds are unsuitable for many uses because of discoloration due to the sulphur impurities. When the oxy-compounds are used as intermediates in the preparation of other compounds, compositions, etc., sulphur impurities present in the raw material may render the resultant product of much less value. In many cases, when the conversion process involves catalysis with metal and metal-containing contact bodies as silver, copper, nickel, cobalt, iron, etc., the sulphur compounds have a deleterious effect on the activity of the catalyst by poisoning the same and inducing side reactions.

Hitherto, no practical and economical methods have been proposed for purifying the alcohol derivatives of the type herein described when such compounds or their mixtures are contaminated with relatively small amounts of oxidizable sulphur-containing compounds as hydrogen sulphide, carbonyl sulphide, mercaptans, carbon disulphide, thioethers, organic polysulphides, mercaptides, and the like. Removal of the sulphur impurities has been attempted by subjecting the contaminated material to repeated rectifications and to treatments with concentrated sulphuric and other acids. These methods of purification have, however, proved themselves to be unsatisfactory. They are, for the most part, inefficient in that only inorganic sulphur compounds are acted upon and, in addition, the conditions of treatment necessary to effect substantial oxidation of the impurities are so vigorous and difficult to control that the oxy-compound undergoing purification is attacked and destroyed to such an extent that due to the loss in material the cost of purification is prohibitive.

By our method, the objectionable sulphur-containing impurities are oxidized to readily removable or inoxious sulphur bodies easily and economically under conditions at which substantially no destruction of the treated material by oxidation, condensation or other means occurs.

Our process is applicable with excellent results to neutral oxygen-containing alcohol derivatives of the class consisting of ethers, carboxylic acid esters and the aldehydes and ketones. The group of suitable compounds may for the sake of clearness and convenience be represented by the general formula R—X, wherein R represents an organic radical linked to X by means of a carbon atom and X represents one of the groups —OR', —COOR$^2$ or —COR$^3$, R' representing an organic radical linked to the O atom by a carbon atom, R$^2$ representing a metal or an organic radical linked to the O atom by a carbon atom, and R$^3$ represents hydrogen or an organic radical linked to the O atom by a carbon atom.

It is seen that the ethers may be represented by the formula R—O—R' wherein R and R' may be the same or different and represent alkyl, aralkyl, alkenyl, aralkenyl, aromatic, alicyclic and heterocyclic radicals which may be substituted by suitable inorganic as well as organic substituents. For example, we may purify ethers as diethyl, dipropyl, dibutyl, methyl ethyl, butyl ethyl, diallyl, diisobutenyl, ethyl isobutenyl, diphenyl, phenyl ethyl and the like and their homologues, analogues and suitable substitution products.

The neutral carbonylic compounds may be represented by the general formula

wherein R represents an organic radical linked to the CO group by a carbon atom and X represents hydrogen, an organic radical which may be the same or different than R, or the radical —OR', R' representing an organic radical linked to the CO group by a carbon atom. R, R' as well as the radical X when the compound is a ketone may represent alkyl, aralkyl, alkenyl, aralkenyl, aromatic, alicyclic and heterocyclic radicals which may be further substituted.

A group of suitable esters which are represented by the formula R—COO—R' includes among others compounds as methyl acetate, ethyl formate, ethyl butyrate, butyl isobutyrate, allyl acetate, isobutenyl acetate, the malonic acid esters, isopropyl acetate and the like and their homologues, analogues and suitable substitution products.

Our invention is particularly applicable to the purification of aldehydes and ketones. These compounds are represented by the formula R—CO—R' wherein R represents an organic radical linked to the CO group by a carbon atom and R' represents an organic radical which may be the same or different than R and which is linked to the CO group by a carbon atom, or hydrogen. In the former case, the compound is a ketone while when R'=H the compound is an aldehyde.

Our invention is of particular value as applied to the purification of aliphatic aldehydes and ketones derived from alcohols prepared by the hydration of olefines. For example, the aldehydes as formaldehyde, acetaldehyde, propionaldehyde, the butyraldehydes, the valeraldehydes and the like and the ketones as acetone, methyl ethyl ketone, diethyl ketone, dipropyl ketone, methyl propyl ketone and the like as well as their homologues, analogues and suitable substitution products may be substantially purified of objectionable sulphur compounds by our method.

The method of the invention provides a very effective and economical means of purifying acetone contaminated with oxidizable sulphur compounds. A substantially sulphur-free acetone meeting all trade requirements for pure acetone, and which is suitable for all uses to which acetone may be put, is readily obtained under conditions at which losses of the treated acetone are insignificant.

Acetone to be suitable for use in the manufacture of artificial silks as rayon and the like cellulose ether and ester materials is required to be free of sulphur compounds which will cause discoloration of an aqueous ammoniacal silver nitrate solution added thereto. This extremely sensitive test for oxidizable sulphur compounds in acetone is known as the Celanese test. It is estimated that as little as one part of H₂S to ten million parts of acetone will give a positive color test with this reagent. By our method, we may treat acetone containing prohibitive amounts of sulphur compounds and obtain an acetone which passes the Celanese test, that is, does not discolor an aqueous ammoniacal silver nitrate solution.

In the execution of our invention we employ those oxidizing agents capable of oxidizing the sulphur-containing impurities to inoxious or readily removable sulphur bodies at temperatures and contact times at which destruction of the organic oxy-compound is substantially obviated. A selected oxidizing agent may be employed per se or in solution or suspension in water or any other suitable medium. The oxidizing agent may be applied under neutral, slightly acidic or alkaline conditions. It is to be understood that the use of destructive strong mineral acids as concentrated sulphuric, nitric, etc., is not contemplated.

The purification reaction is preferably executed under alkaline conditions. The oxidizing agent may of itself be alkaline, or it may be acidic or neutral. In the latter cases, it is preferably applied in the presence of water and an alkaline-acting substance. We have found that under conditions of our invention the alkali-metal hydroxides in the solid state act as oxidizing agents for some sulphur-containing impurities. When such impurities are present, the solid hydroxide in the form of pellets, granules, powder, etc., may be added to the material to be treated under conditions at which oxidation occurs, or the contaminated material may be passed in the vapor or gas phase over the solid oxidizing agent. For example, the material to be treated may be distilled through a column packed with pellets of an alkali-metal hydroxide.

Particularly suitable oxidizing agents, which are preferably employed in the presence of water under alkaline conditions, are the alkali-metal permanganates as sodium permanganate, potassium permanganate, etc.; the metal chromates as sodium chromate, potassium chromate, calcium chromate, magnesium chromate, lead chromate, lithium chromate, etc.; the metal dichromates as sodium dichromate, potassium dichromate, the alkali-metal and ammonium persulphates, the basic lead acetates, the halogens, the metal chlorates as sodium chlorate, potassium chlorate, calcium chlorate, aluminum chlorate, barium chlorate, cadmium chlorate, cobalt chlorate, copper chlorate, etc.; the perchlorates as ammonium perchlorate, barium perchlorate, sodium perchlorate, cobalt perchlorate, etc.; the alkali- and alkaline earth metal hypohalites as sodium hypochlorite, potassium hypochlorite, sodium hypobromite, calcium hypochlorite, etc.; the more unstable organic hypohalites as the primary and secondary alkyl hypochlorites and hypobromites as ethyl hypochlorite, isopropyl hypochlorite, secondary butyl hypochlorite, etc. In some cases, the inorganic peroxides as sodium peroxide, barium peroxide and the like as well as the organic peroxides as ethyl hydrogen peroxide, diethyl peroxide, acetone peroxide, triacetone peroxide, benzoyl peroxide and the like may be employed. The particular sulphur compound or compounds to be oxidized may be used as a basis for the selection of an oxidizing agent of the requisite oxidizing power.

The halogen-containing oxidizing agents particularly the alkali and alkaline earth hypohalites, chlorates and perchlorates as well as the organic hypohalites are preferably employed as oxidizing agents. For example, excellent results may be obtained by employing the relatively inexpensive and readily prepared sodium, potassium and calcium hypochlorites as well as other hypohalites of the alkali-forming metals.

The amount of the oxidizing agent to be employed will be dependent upon the sulphur-containing compound content of the material to be purified. The sulphur content of the material can be determined by any of the well-known analytical methods. A test run will enable the operator to determine the optimum amount to use for efficient and economical purification. The oxidizing agent may be used in amounts just sufficient to oxidize the sulphur impurities or the oxidizing agent may be employed in excess. Generally, the use of a substantial excess is to be avoided since considerable deterioration of the treated material may result when the same is subsequently treated for removal of the oxidized sulphur bodies.

Although our invention is described with particular reference to the purification of organic oxy-compounds containing oxidizable sulphur compounds, it is to be understood that the same may be applied to such oxy-compounds contaminated with other types of oxidizable impurities alone or in the presence of oxidizable sulphur compounds. For example, saturated organic oxy-compounds as the ethers, aldehydes and ketones which contain as impurities, compounds as the readily oxidizable unsaturated aldehydes, ketones, alcohols, ethers, etc., may be substantially purified therefrom by our method. In many cases, under conditions at which the sulphur-containing impurities are oxidized, other oxidizable impurities are also removed.

The invention may be executed in a variety of suitable manners. A preferred mode of operation comprises conducting the material to be treated to a suitable reaction vessel preferably so constructed that the contents may be agitated as by mechanical stirring and heated under atmospheric or superatmospheric pressure or cooled as the particular operation may require. If desired, the treatment may be effected in the kettle of a distilling apparatus and the treated material distilled therefrom subsequent to the purification treatment. The treatment and the recovery of the treated material may be effected in separate vessels which may, if desired, be in communication with each other.

When distillation methods of recovering the purified material from the treated mixture are resorted to, the oxidized sulphur bodies, depending upon their nature may boil at a higher or lower temperature than the purified material. In the former case, they may be substantially separated by topping the mixture, the sulphur bodies being removed with the first fraction or fractions. In the latter case, the oxidized sulphur bodies will, for the most part, remain in the still as bottoms following distillation of the substantially pure material therefrom.

The oxidizing agent, per se or in solution or suspension in a suitable medium as water, may be added all at once or added to the material slowly, preferably with stirring. The temperature of the material is maintained sufficiently low to avoid excessive oxidation of the oxy-compound. Generally, we operate at temperatures of about 25° C., although higher and lower temperatures may be used when necessary or desirable. The mixture is allowed to stand for a period of time sufficient to effect the desired oxidation of the sulphur impurities. The time of contact will vary with the nature and amount of the sulphur compounds present, the amount, concentration and oxidizing power of the specific oxidizing agent employed, the temperature of operation and the efficiency of the contacting of the reactants. Another suitable means of operating comprises introducing a solution or suspension of the oxidizing agent, in the required amount, into a conduit through which a turbulent flow of the material to be treated is maintained. The size of the conduit, the rate of flow of the material through it, and the amount and concentration of the oxidizing agent may be so regulated that oxidation of the impurities is effected on one passage of the material through the conduit. In this manner, the impure material may be treated continuously while it is being conducted to a storage tank or to a purification stage where the substantially pure material may be continuously recovered by distillation.

After the material has been treated until the sulphur compounds are oxidized to the desired extent, the treated material may be directly rectified to effect separation of the oxidized sulphur bodies or other means of effecting separation may be resorted to. When the material treated for removal of oxidizable sulphur compounds is in a substantially pure condition, it may not require efficient fractionation to separate the pure material from the oxidized sulphur bodies. Topping off or flashing off the material may be sufficient. If an aqueous layer is present, said layer may be separated prior to effecting distillation. When solid materials are present, the treated material may be filtered to effect their removal.

The following specific examples illustrate preferred modes of executing our invention. It is to be understood that it is not our intention to limit the scope of the invention to the procedure, materials or conditions of these illustrative examples.

*Example I*

About 1.0 cc. of 1N NaOH solution and about 10 cc. of a 0.1N $I_2$ solution were added to about 250 cc. of impure acetone which gave a positive Celanese test and had a total sulphur content of about 0.001% as determined by the lamp method. The mixture was allowed to stand at room temperature for about four hours. At the end of this time the mixture was fractionated.

The fractionation yielded about 223 cc. of a substantially pure acetone which gave a negative Celanese test, that is, there was no discoloration, and by analysis contained less than 0.0005% sulphur. The oxidized sulphur bodies were for the most part left in the still as bottoms. The bottoms contained about 0.0034% total sulphur as determined by the lamp method.

*Example II*

About 1 gram of basic lead acetate was dissolved in about 20 cc. of water and the solution mixed with about 1000 cc. of acetone which gave a positive Celanese test and had a total sulphur content of about 0.001%. The mixture was allowed to stand at about room temperature for about 30 minutes. At the end of this time the mixture was charged to a suitable still and fractionated.

The first cut out of about 50 cc. was discarded. The second and third cuts of about 400 cc. each, which contained 0.0003% and 0.0001% total sulphur, respectively, gave a negative Celanese test. The oxidized sulphur bodies were for the most part present in the still as bottoms.

Example III

Three 1000 cc. portions of crude acetone contaminated with undesirable sulphur compounds were treated as below listed and the treated material distilled and tested.

| Nature of treatment | Celanese test | Total sulphur |
|---|---|---|
| | | Percent |
| Distilled—no treatment | Positive | 0.016 (blank) |
| 0.5 gm. $I_2$ and 5 cc. of 20% NaOH added | Negative | 0.008 |
| 2 gm. lead acetate added | Negative | 0.0034 |

Example IV

About 1000 cc. of a contaminated acetone which had a total sulphur content of about 0.0006% and which gave a positive Celanese test was charged to a suitable reaction vessel and stirred at about room temperature while about 5 cc. of a sodium hypochlorite solution which contained about 0.35 gm. of NaOCl, and about 5 cc. of a 20% NaOH solution were added thereto.

After allowing a few minutes to insure complete reaction, the treated material was distilled. The following cuts were taken, tested and analyzed as follows:

| Cut | Celanese test | Total sulphur |
|---|---|---|
| Cubic centimeter | | |
| 1–50 | Negative | |
| 2–500 | Negative | 0.0002% |
| 3–400 | Negative | Less than 0.0001% |

Example V

A crude sulphur contaminated acetone which gave a positive Celanese test and had a total sulphur content of about 0.0006% was flashed off, with no fractionation, through a distilling column packed with NaOH pellets. The condensed material gave a positive Celanese test and contained 0.0002% S. This material was then fractionated in an ordinary fractionation apparatus.

The distillate was a substantially pure and sulphur free acetone. It gave a negative Celanese test, had a satisfactory color and odor and contained less than 0.0001% total sulphur by the lamp method.

Example VI

About 3 liters of a contaminated acetone were distilled through a fractionating column the lower portion of which was packed with NaOH pellets and the upper portion of which was packed with glass rings. A portion of the column above the NaOH pellets was packed with glass rings for the purpose of effecting fractionation to separate diacetone alcohol, small amounts of which may be formed by molecular condensation of acetone. Distillation was effected under a reflux ratio of about 1 to 1. The condensed distillate tested as follows:

Celanese test _____ Negative
Acidity _____ None
Color _____ 0–5
$KMnO_4$ test _____ Negative

Example VII

About 1500 cc. of acetone which had been previously distilled was contacted with about 2 gm. of potassium persulphate in aqueous solution and about 20 cc. of a 1N NaOH solution. The mixture was stirred for a few minutes and then distilled. The distillate which was collected in a boiling range of from about 55° C. to 58° C. was tested. It gave a negative Celanese test and contained about 0.0002% total sulphur.

A crude contaminated acetone was treated under the same conditions and using the same amounts of potassium persulphate and sodium hydroxide. The acetone obtained by distilling the treated material gave a negative Celanese test and had a total sulphur content of about 0.005%.

It will apparent to those skilled in the art to which this invention appertains that the same may be advantageously executed in a batch, intermittent or continuous manner. Purification may be effected in one or a plurality of stages in communication with one or more recovery stages in which the treated material may be continuously separated from the oxidized sulphur bodies by rectification or other means.

While we have described our invention in a detailed manner and provided specific examples illustrating suitable modes of executing the same, it is to be understood that modifications may be made and that no limitations other than those imposed by the appended claims are intended.

We claim as our invention:

1. A process for the purification of neutral organic oxygen-containing alcohol derivatives contaminated with oxidizable sulphur-containing impurities which comprises contacting the oxy-compound in the liquid phase with an oxidizing agent at a temperature and for a time adequate to oxidize the sulphur-containing impurities without substantially acting upon the organic oxy-compound.

2. A process for the purification of neutral organic oxygen-containing alcohol derivatives contaminated with oxidizable sulphur-containing impurities which comprises contacting the oxy-compound in the liquid phase with an alkaline oxidizing agent at a temperature and for a time adequate to oxidize the sulphur- containing impurities without substantially acting upon the organic oxy-compound.

3. A process for the purification of neutral organic oxygen-containing alcohol derivatives contaminated with oxidizable sulphur-containing impurities which comprises contacting the oxy-compound in the liquid phase with an oxidizing agent in the presence of water at a temperature and for a time adequate to oxidize the sulphur-containing impurities without substantially acting upon the organic oxy-compound.

4. A process for the removal of oxidizable sulphur-containing impurities from neutral organic oxygen-containing alcohol derivatives which comprises contacting the liquid oxy-compound to be purified with an oxidizing agent at a temperature below that at which substantial destruction of the organic oxy-compound occurs, for a time and with the oxidizing agent present in an amount sufficient to oxidize the sulphur impurities to readily removable oxidized sulphur bodies, and separating the oxidized sulphur bodies.

5. A process for the removal of oxidizable sulphur-containing impurities from neutral organic oxygen-containing alcohol derivatives of the class consisting of ethers, esters, aldehydes and ketones which comprises contacting the liquid oxy-compound to be purified with an oxidizing agent under alkaline conditions at a temperature below that at which substantial destruction of the organic oxy-compound occurs, for a time and with the oxidizing agent present in an amount sufficient to oxidize the sulphur impurities, and separating the oxidized sulphur bodies.

6. A process for the removal of oxidizable sulphur-containing impurities from organic ethers which comprises contacting the liquid ether to be purified with an oxidizing agent under alkaline conditions at a temperature below that at which substantial destruction of the ether occurs, for a time and with the oxidizing agent present in an amount sufficient to oxidize the sulphur impurities, and separating the oxidized sulphur bodies.

7. A process for the purification of neutral alcohol derivatives of the class consisting of ethers, esters, aldehydes and ketones which are contaminated with oxidizable sulphur-containing impurities which comprises contacting the material to be purified, in the liquid phase with an aqueous alkaline solution of a halogen at a temperature below that at which substantial destruction of the organic oxy-compound occurs, for a time sufficient to oxidize the sulphur-containing impurities.

8. A process for the purification of an aldehyde contaminated with oxidizable sulphur-containing impurities which comprises contacting the aldehyde in the liquid phase with an oxidizing agent under alkaline conditions at a temperature below that at which substantial destruction of the aldehyde occurs, for a time sufficient to oxidize the sulphur containing impurities.

9. A process for the purification of a ketone contaminated with oxidizable sulphur-containing impurities which comprises contacting the ketone in the liquid phase with a hypohalite under alkaline conditions at a temperature below that at which substantial destruction of the ketone occurs, for a time sufficient to oxidize the sulphur-containing impurities.

10. A process for the purification of a ketone contaminated with oxidizable sulphur-containing impurities which comprises contacting the ketone in the liquid phase with a hypohalite of an alkali-forming metal under alkaline conditions in the presence of water at a temperature below that at which substantial destruction of the ketone occurs, for a time sufficient to oxidize the sulphur-containing impurities.

11. A process for the purification of a ketone contaminated with oxidizable sulphur-containing impurities which comprises contacting the ketone in the liquid phase with a solid alkali-metal hydroxide at a temperature and for a time sufficient to oxidize the sulphur-containing impurities while leaving the ketone substantially unaffected.

12. A process for the purification of acetone contaminated with oxidizable sulphur-containing impurities which comprises contacting the acetone in the liquid phase with an oxidizing agent at a temperature below that at which substantial destruction of the acetone occurs, for a time sufficient to oxidize the impurities.

13. A process for the removal of oxidizable sulphur-containing impurities from acetone which comprises contacting the acetone in the liquid phase with a solid alkali-metal hydroxide at a temperature and for a time sufficient to oxidize the sulphur-containing impurities while leaving the acetone substantially unaffected.

14. A process for the purification of acetone containing oxidizable sulphur-containing impurities which comprises treating the acetone in the liquid phase with a hypohalite in the presence of water at a temperature below that at which substantial destruction of acetone occurs, for a time sufficient to oxidize the sulphur-containing impurities.

15. A process for the purification of acetone containing oxidizable sulphur-containing impurities which comprises contacting the acetone in the liquid phase with an amount of an aqueous alkaline solution of sodium hypochlorite sufficient to oxidize the impurities at a temperature below that at which substantial destruction of the acetone occurs, for a time sufficient to oxidize the sulphur-containing impurities, and distilling the treated material to separate the oxidized sulphur bodies.

16. A process for the purification of a ketone containing oxidizable sulphur-containing impurities in an amount sufficient to discolor an aqueous ammoniacal silver nitrate solution but insufficient to impart a disagreeable odor to the ketone which comprises treating the ketone in the liquid phase with an oxidizing agent for a time and at a temperature sufficient to oxidize the impurities without effecting substantial destruction of the ketone, and distilling the mixture whereby the oxidized sulphur bodies are separated and a ketone which will not discolor an aqueous ammoniacal silver nitrate solution is obtained.

17. A process for the purification of acetone containing oxidizable sulphur-containing impurities in an amount sufficient to discolor an aqueous ammoniacal silver nitrate solution but insufficient to impart a disagreeable odor to the acetone which comprises treating the acetone in the liquid phase with an oxidizing agent under alkaline conditions for a time and at a temperature sufficient to oxidize the impurities without effecting substantial destruction of the acetone, and distilling the mixture whereby the oxidized sulphur bodies are separated and acetone which will not discolor an aqueous ammoniacal silver nitrate solution is obtained.

18. A process for the purification of acetone containing oxidizable sulphur-containing impurities in an amount sufficient to discolor an aqueous ammoniacal silver nitrate solution but insufficient to impart a disagreeable odor to the acetone which comprises treating the acetone in the liquid phase with an amount of an aqueous alkaline solution of an alkali-metal hypohalite not substantially in excess of that required to oxidize the impurities, for a time and at a temperature adequate to oxidize the impurities without effecting substantial destruction of the acetone, and distilling the treated mixture whereby the oxidized sulphur bodies are separated and acetone which will not discolor an aqueous ammoniacal silver nitrate solution is obtained.

RICHARD Z. MORAVEC.
THEODORE EVANS.
CECIL HUMPHREYS.